United States Patent [19]

Moll et al.

[11] Patent Number: 4,525,093

[45] Date of Patent: Jun. 25, 1985

[54] MODULAR FRAMEWORK SYSTEM FOR FURNITURE RACKS OR SIMILAR ARTICLES

[75] Inventors: Reiner Moll, Wilhelmstrasse 19, D-7070 Schwaebisch Gmuend, Fed. Rep. of Germany; Armin Hornung, Singen, Fed. Rep. of Germany

[73] Assignee: Reiner Moll, Schwaebisch Gmuend, Fed. Rep. of Germany

[21] Appl. No.: 430,611

[22] Filed: Sep. 30, 1982

[30] Foreign Application Priority Data

Oct. 24, 1981 [DE] Fed. Rep. of Germany ....... 3142283

[51] Int. Cl.³ .............................................. F16B 13/00
[52] U.S. Cl. ...................................... 403/4; 403/174; 403/297; 403/403
[58] Field of Search ............... 403/297, 170, 171, 176, 403/172, 217, 169, 295, 174, 178, 4, 205, 403; 248/188.4, 653, 656; 46/27, 28, 29; 446/85, 122, 123, 126 (U.S. only)

[56] References Cited

U.S. PATENT DOCUMENTS

| | | | |
|---|---|---|---|
| 2,063,895 | 12/1936 | Mack | 46/28 |
| 4,084,344 | 4/1978 | Asano | 46/28 |
| 4,124,322 | 11/1978 | Parisien | 403/297 |
| 4,291,999 | 9/1981 | Vandelanoite | 403/297 |
| 4,406,560 | 9/1983 | Pickering | 403/297 |
| 4,421,434 | 12/1983 | Magner | 403/205 |

FOREIGN PATENT DOCUMENTS

| | | | |
|---|---|---|---|
| 53993 | 6/1982 | European Pat. Off. | 403/171 |
| 2037124 | 4/1972 | Fed. Rep. of Germany | 46/27 |

*Primary Examiner*—Thomas F. Callaghan
*Attorney, Agent, or Firm*—Cushman, Darby & Cushman

[57] ABSTRACT

A modular framework system (construction set) for the production of racks for furniture from hollow forms and corner connections; the corner connections have corner connections and plugs; the corner pieces have a connection body with two continuous channels which run at right angles to one another; pegs of half width, "half pegs" start outside on the connection body; the pertinent plugs likewise have half pegs which may be inserted in various ways, so that one will obtain corner connections in the shape of an angle, of a T or of a cross; the half pegs have half conical threads which, after plugging in, supplement each other to full conical threads; wherein by screwing in of stud screws, the corner connections are secured against pulling apart and are locked in the hollow forms.

4 Claims, 17 Drawing Figures

MODULAR FRAMEWORK SYSTEM FOR FURNITURE RACKS OR SIMILAR ARTICLES

BACKGROUND AND SUMMARY OF THE INVENTION

The invention relates to a moduear framework system or construction set for the corner connection of racks for items such as pieces of furniture. The corner connections are to connect rods of racks with one another. These may be massive rods whose ends are hollow forms. Preferably however hollow form rods are used, for example, made of light metal or a plastic of dimensional stability.

The construction set permits corner connection of various kinds by simple insertion. Corner connections, (viewed in a main plane), are of angular shape, T-shape or cross shape. In the case of angular and T-shape joints openings in a connection body of the corner joint are completely filled so that the outside surface interrupted by the insertion channels is flush, so that an aesthetically satisfactory impression is made.

This task is accomplished by the present invention.

In the case of insertion of plugs into the connection body, the half pegs of the corner pieces and of the plugs always supplement and complement each other to complete pegs. The ends of the hollow forms of the rods may then be slipped over the complete pegs formed. Thus, the half pegs of a plug may be inserted in two basically different directions into the channel of a connection body (namely, either from the side, at which a half peg starts at the connection body or from the direction of the opposite side).

By the arrangement of the channels and of the half pegs of the corner piece in connection with the half pegs of the plugs, producing corner joints of angular shape, T-shape or cross shape according is a matter of choice. To achieve this flexibility, only one corner piece and two plugs are required for a corner joint.

According to another form of the invention, with proper dimensioning of the length of the half plugs, after inserting a half plug from the direction of the side of the corner piece-half plug, the half plug just matches the outside surface of the connection body, so that the channel is entirely filled and an optically satisfactory impression results.

According to another embodiment, it is possible to smoothly close the outside surface of the connection body by the front surface of the inserted half peg, even if it has some other than a plane surface shape.

According to this invention the pegs composed of two half pegs may be secured by the insertion process within a half form by the screwing in of screws (especially stud screws) to prevent slippage. The screws are inserted into openings of the ends of the hollow forms.

Plugs plugged into the connection body from any side always place a half thread into a position to fit to a half thread of the connection body half-peg.

The connection bodies may be formed such that ends of hollow forms may not only be inserted in one plane but also transversely thereto. For the formation of all possible angular corner connections with insertion plugs lying in the main plane or projecting transversely to this main plane, three different corner pieces suffice, mainly such with one or two insertion pegs, and such without any such insertion pegs.

The construction set may be enlarged by a height adjustment device, known per se, which by means of its half-peg offers the possibility to insert it simply into a connection body. As a result of that a shelf or something like may be lifted or lowered in relation to the floor and may be braced as against the ceiling of the room.

Embodiments of the invention will be described by way of examples on the basis of the attached drawings.

DETAILED DESCRIPTION OF THE INVENTION

Figure 1:
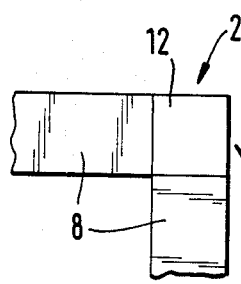
FIGS. 1, 2 and 3 show a top view the form of a right angle, in T-shape or cross shape.
Figure 2:
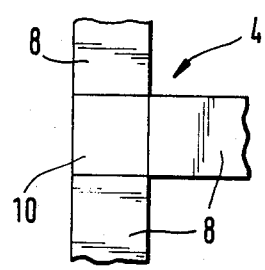
Figure 3:
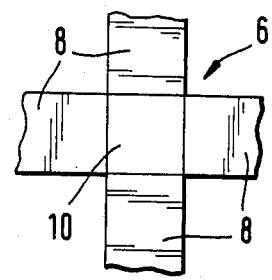

FIGS. 1 to 3 show three different corner connections 2, 4 and 6 in angular form, T-shape and cross shape, respectively. The plane in which these three corner connections are viewed will be called the "main plane" in the following text. The corner connections consist always of one corner piece which in the following text will be described in more detail on the basis of FIGS. 4 to 6 and 9, and of put-on hollow forms 8. From the end-piece, which as a whole is designated by 10, one can only recognize a connection body 12.

Figure 4:
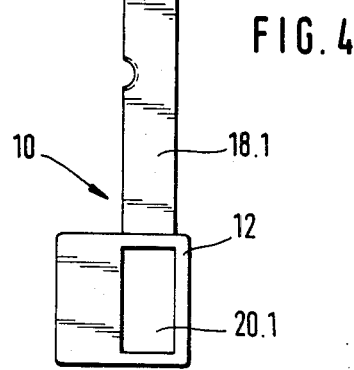
FIGS. 4, 5 and 6 show a corner piece in three mutually perpendicular views.
Figures 5, 6:
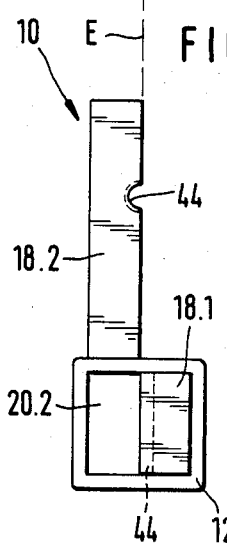

The FIGS. 4 to 9 show the structure of the corner piece 10 and of the two pertinent plugs 14. The connection body 12 of the angular piece in this case, is a cube shaped hollow body, from which two pegs extend outwardly, the cross sections of which with the necessary clearance are equal to half the inside cross section of the ends of the hollow cube and which threfore are called "half pegs" 18.1 and 18.2. Let E designate a plane, which in the embodiments forms a middle plane, but does not necessarily have to be a middle plane and which runs in parallel to the above mentioned main plane. The half peg 18.1, as FIGS. 4 and 5 show, lies to the right of plane E. The half peg 18.2 lies to the left of this plane.

In the connection body 12, on both sides of the plane E, two channels 20.1 (to the right of E) and 20.2 (to the left of E) running at right angles to one another have been provided. These channels result from the hollow inside space of the connection body 12 and perforations of its outside walls. Inside of the connection body the two channels pass into one another.

Figure 9:
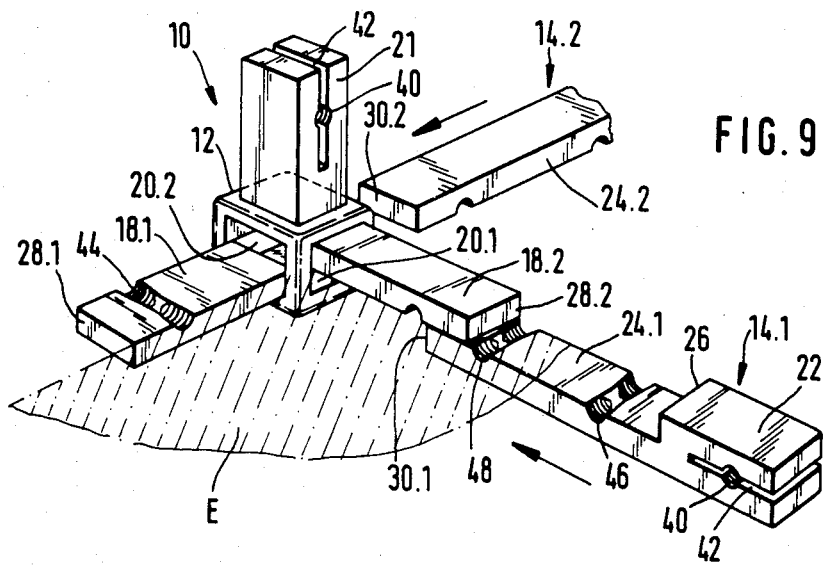
FIG. 9 shows in perspective an end piece with two associated plugs, one of which has only been shown in part.

FIG. 9 shows an end piece 10 in perspective, wherein however, contrary to FIG. 4 to 6, insertion plug 21 starts out from the connection body 12 and projects transversely to plane E. The cross section of this insertion peg corresponds to the full inside width of the ends of the hollow form 8. An equal insertion peg 21 may start on the opposite side, the lower one in FIG. 9, of the connection body 12. In this way three dimensional corner connections may also be produced.

Figure 7:
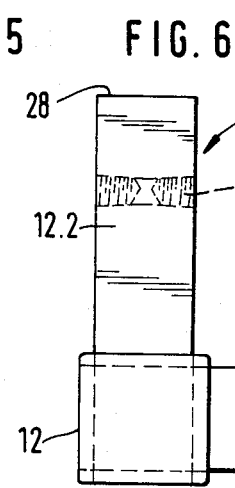
FIGS. 7 and 8 show a plug in two mutually perpendicular views.
Figure 8:
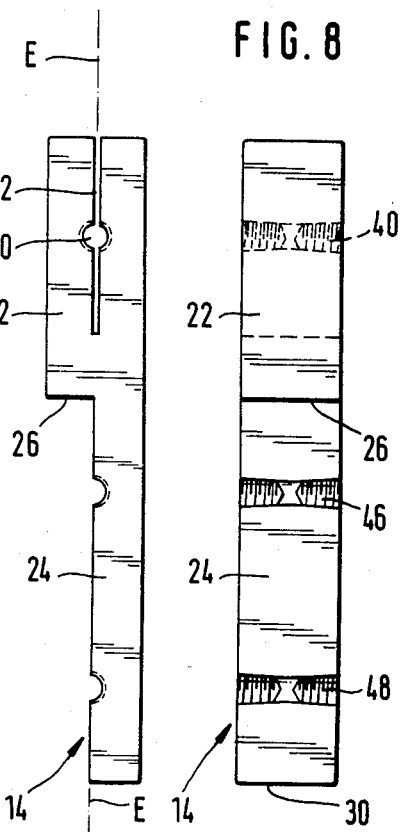

FIGS. 7 and 8 show a pertinent plug 14, (in FIG. 9 designated by 14.1 and 14.2). Every plug consists of two parts, namely an insertion peg 22 of full cross sectional width and a half peg 24 starting out from there, which lies on the one side of a plane E (FIG. 7) of the plugs. The plane E is also indicated in FIG. 9. Here one may recognize clearly that corner piece 10, has the half-peg 18.2 above the plane E and at right angles to the channel 20.2, and below the plane E the half peg 18.1 and the channel 20.1. Both channels run at right angles of each other, likewise the two half pegs.

As FIG. 9 shows, T-shaped corner connections 4 may be made by pushing the half peg 24.1 of a plug 14 below the half peg 18.2 of the corner piece 10 into the channel 20.1. The half peg 24.1 is so long that when a shoulder 26 of the plug abuts the front surface 28.2 of the half peg 18.2, the front surface 30.1 of the half peg 24.1 lies in one plane with the left, rear outside surface of the connection body 12. The channel 20.1 therefore will be filled completely. The front surface 30.1 passes over flush into the outside surface of the connection body 12.

The plug 14.2 show only partially in FIG. 9 on top, which however has the same shape as plug 14.1 is pushed in in a different manner than the plug 14.1 for the formation of a T-shaped corner connection 4, namely at first into the connection body 12. It therefore passes at first through the channel 20.2 and runs subsequently in parallel to the half peg 18.1. After the pushing in, the two front surfaces 30.2 and 28.1 of both half pegs form one common plane.

In order to form the other two possible corner connections 2 and 6 of angular or cross shape it is necessary to merely plug in the plugs in a different manner. If both plugs are pushed in in the manner of plug 14.1 in FIG. 9 (i.e., first in parallel to the half-pegs 18.1 and 18.2, and then into the pertinent channels of the corner piece 10) then the corner connection 2 will result in angular form. The front surfaces 30.1 and 30.2 there pass over flush with the outside surfaces of the connection body 12.

If, on the contrary a corner connection 6 in cross shape is to be made, then both plugs are introduced, just as the plug 14.2 in FIG. 9, namely in such a way that they first penetrate the channels and then run in parallel to the half-pegs 18.1 and 18.2 of the corner piece 10.

All cases result in neatly looking corner connections. In case of the cross-shaped corner connection 6, all channels naturally are closed. In case of the corner connections 2 and 4 in angular or T-shape respectively, the outside openings of the channels which remain unobstructed are closed by the front surfaces 30.1 or 30.2 of the plugs with their outside surfaces flush.

Figure 12:
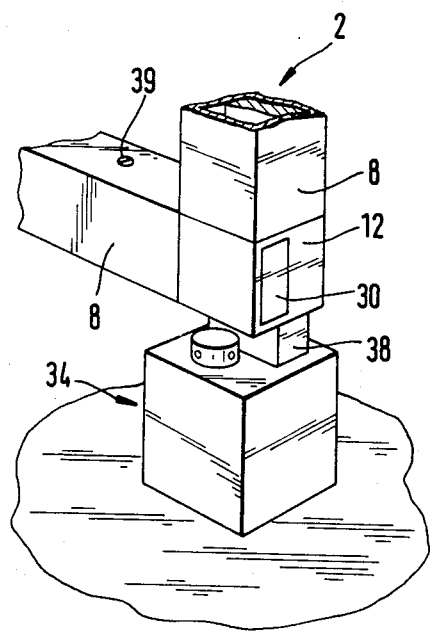

FIG. 12 shows among other things, an angularly shaped corner connection 2 with a connection body 12 and with ends 8 of hollow forms put on the protruding, composed pegs.

Figure 10:
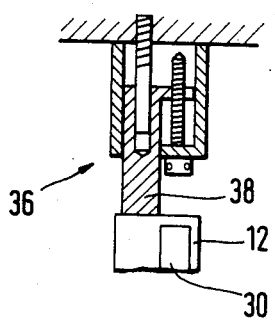
FIG. 10 shows in a perpendicular longitudinal section an upper elevation adjustment device, mounted in an end piece.
Figure 11:
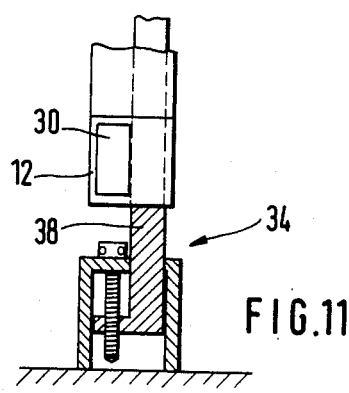
FIGS. 11 and 12 show in longitudinal cut or in perspective a lower elevation adjustment device mounted in a corner piece.

The corner connections 2 and 4 permit the adding of an elevation adjusting device. FIGS. 11 and 12 show a lower elevation adjusting device 34, FIG. 10 an upper elevation adjusting device 36. Devices of this kind are known per se. However what is essential is, that each of these devices has a half peg 38 for attachment to a connection body 12. Whenever an elevation adjusting device is to be attached, then the corner connection 2 or 4 is made of a corner piece 10 and only one plug 14, while the elevation adjusting device with its half peg 38 replaces the other plug. As a result, an angular corner connection 2 becomes a T-shaped one, or a T-shaped corner connection 4 becomes a cross shaped one.

In order to secure and lock the pegs in the ends 8 of the hollow forms, conical threads have been provided, into which hollow set screws may be screwed into the threads, to pass through bores 39 (FIG. 12) of the hollow form ends, so that the two halves of each peg are forced apart and against the inside walls of the form ends. The complete insertion pegs 21, 22 have conical bores 40, which protrude from both sides into the insertion pegs. The axes of the bores coincide with the plane E of the insertion pegs. As a result of a longitudinal slit 42, the outside end of the insertion pegs 21, 22 is subdivided, so that the two halves may be forced apart.

The half pegs of the corner pieces 10 have halves of conical bores 44. The half pegs of the plugs have halves of conical bores 46 and 48. The axes of those half bores in turn, lie in the plane E. Depending on how the plugs are inserted into the corner pieces, the half bores 44 of the corner pieces are supplemented by the half bores 46 or 48 of the plugs to full bores.

Figure 13:
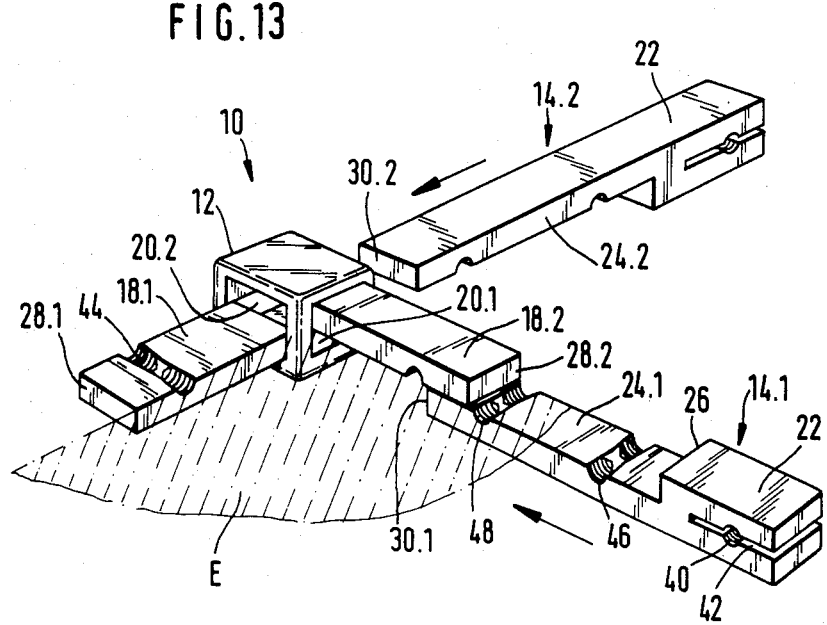
FIGS. 13 and 14 show various interrelationships for the elements of the present invention.
Figure 14:
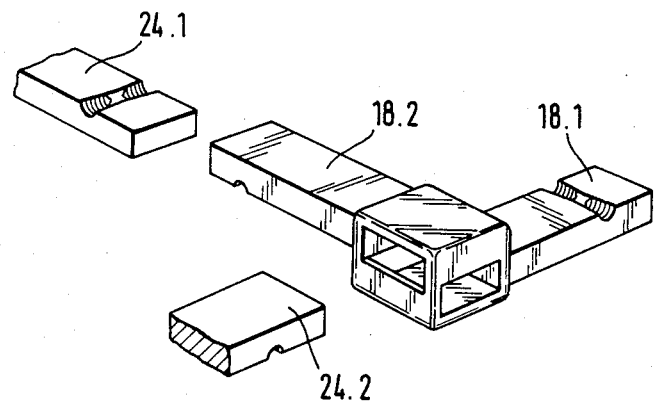
Figure 15:
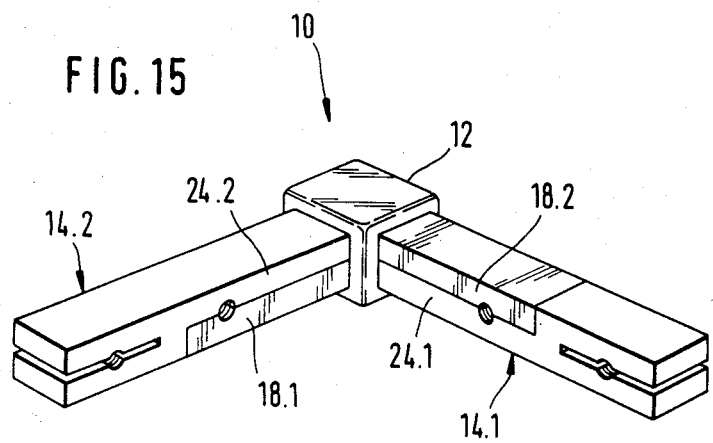
FIGS. 15–17 show the corner connections of FIGS. 1–3, respectively, without the interconnecting rod element 8.
Figure 16:
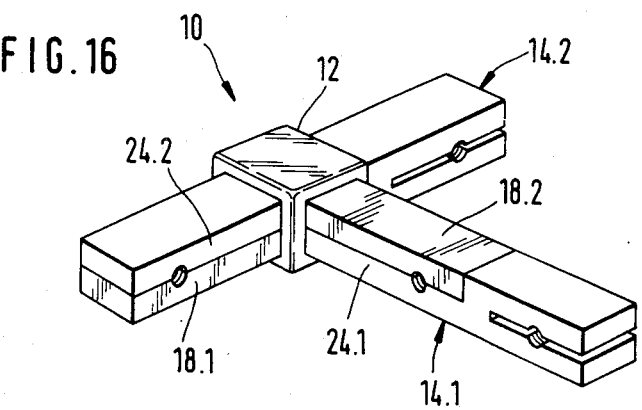
Figure 17:
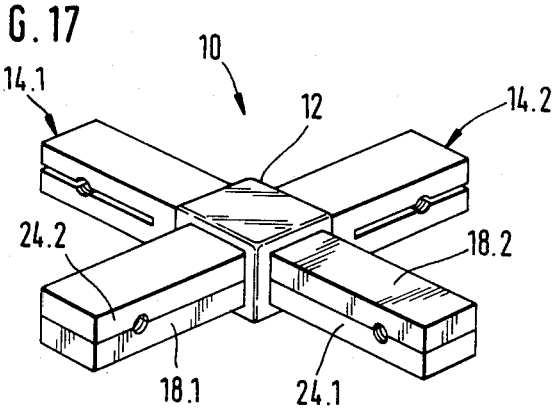

The corner pieces and the plugs may be made of metal, for example, zinc pressure casting or of a dimensionally stable plastic. FIGS. 13-17 show the various selective interrelationships of a corner piece (10) and two plugs (14) of the present invention. FIG. 13 is the same as FIG. 9 but without the upright member 21. FIG. 14 is another perspective of FIG. 13. FIGS. 15-17 are the same as FIGS. 1-3, but without the interrconnecting hollow-end tubes B.

VARIATIONS

The ends of the hollow forms may have other but square cross sections, for example, rectangular, or round shapes. The connection bodies 12 may have other than cubic forms, for example, cuboid shape, ball shape or ellipsoid shape. In that case, the front surfaces 30 of the plugs have a corresponding shape, so that after plugging in, the outside surface of the connection body is continued by the front surfaces 30 of the half pegs.

What is claimed is:

1. A modular framework system for use with hollow-end interconnecting tubes in building furniture or similar articles, comprising:
   a connection body comprising
      a block member having one upper, one lower and four side walls with two transverse through-channels of equivalent cross section traversing the side walls so as to be perpendicular to each other but not intersecting each other, and
      two peg members of equivalent cross section, integrally formed with at least two of the side walls of the block member and projecting outwardly therefrom so as to be perpendicular to each other but not intersecting each other, such that each peg member is placed so as to perpendicularly abut one of said transverse through-channels; and
   at least two plug members each having
      an insertion plug portion adapted to fit into the hollow end portion of an interconnecting tube, and
      half-plug portions of approximately half the cross section of the insertion plugs and which are arranged at one side of a longitudinal center plane of the plug members and are adapted to fit into said channels of the block member while occupying approximately the dimensions of said channels; wherein said at least two plug members may be selectively fitted into said channels so as to form one of an L-shaped, T-shaped and cross-shaped framework.

2. A framework system as in claim 1, wherein
each of said channels has a preselected depth,
each of said peg members has a preselected length, and
the length of each of said half-plug portions is equal to the depth of said channel plus the length of said peg member.

3. A framework system as in claim 2 wherein said half plug portions each have a surface which is adapted to be flush with a surface of said block member.

4. A framework system as in claim 3, wherein said half-plug portions have half conical thread arrangements adapted to complement half conical thread arrangements on said peg members so as to secure said half-plug portions to said connection body by insertion of a screw into the formed whole conical thread arrangement.

* * * * *